Aug. 17, 1965    R. E. DAVIS    3,200,429
PISTON RING GROOVE CLEANER
Filed May 7, 1964    2 Sheets-Sheet 1
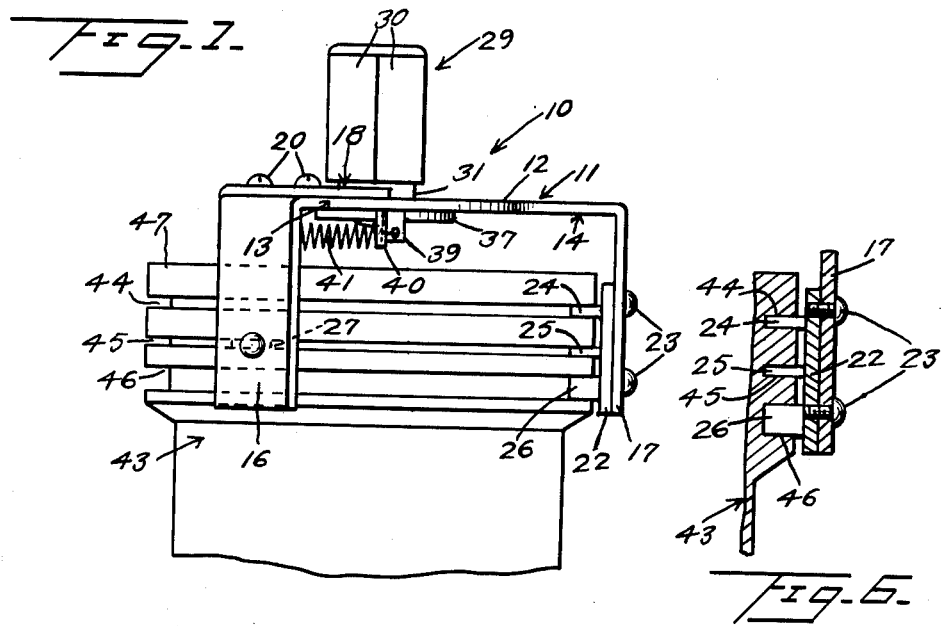
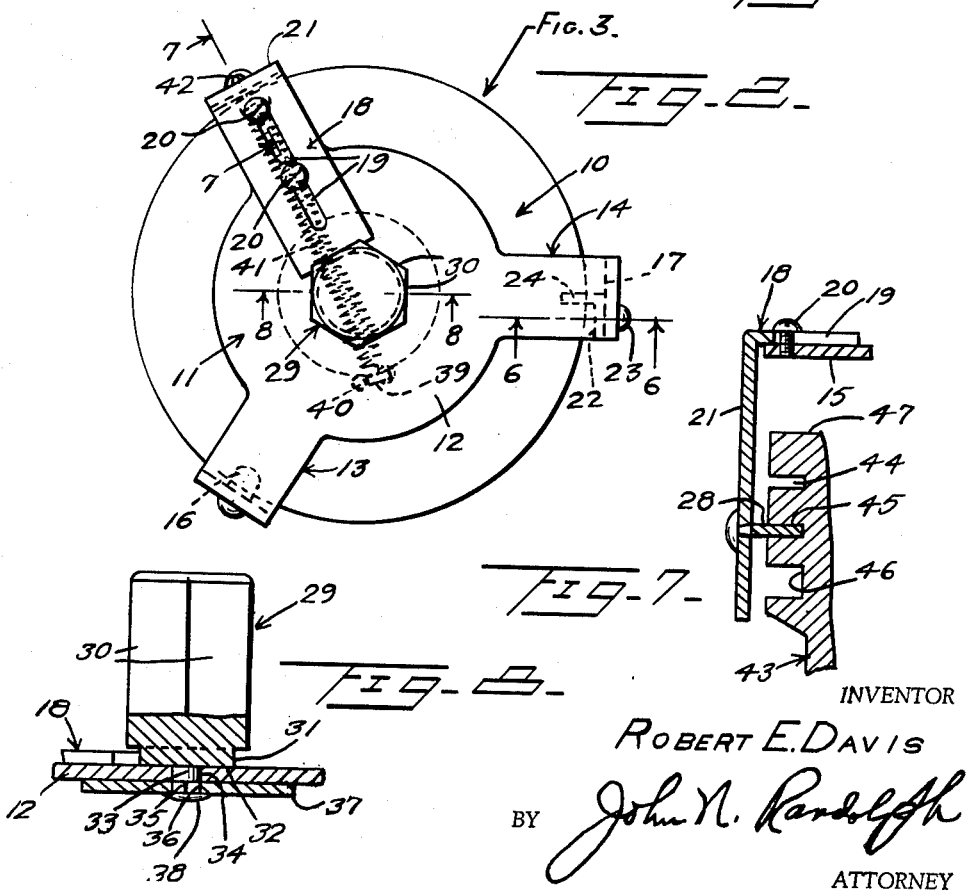
INVENTOR
ROBERT E. DAVIS
BY John N. Randolph
ATTORNEY

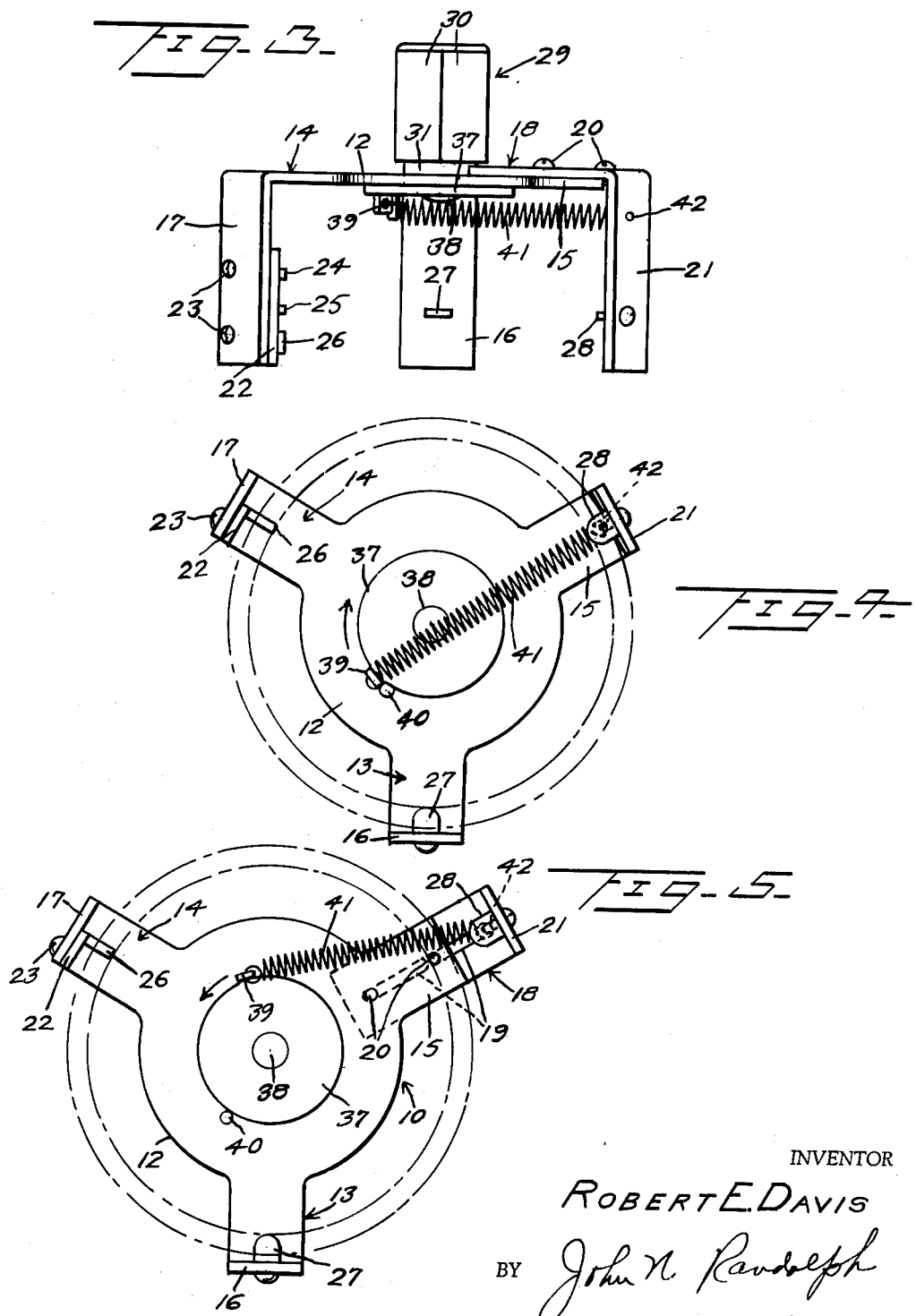

United States Patent Office 3,200,429
Patented Aug. 17, 1965

3,200,429
PISTON RING GROOVE CLEANER
Robert E. Davis, 14253 Collins St., Van Nuys, Calif.
Filed May 7, 1964, Ser. No. 365,577
4 Claims. (Cl. 15—104.01)

This invention relates to a novel tool or implement for simultaneously cleaning carbon and other deposits from all of the ring grooves of an interal combustion engine piston.

Another object of the invention is to provide a ring groove cleaner having a part adapted to be engaged by a wrench or other conventional turning tool for initially turning said part for causing the implement to assume a retracted, operative position engaging the ring grooves, and for thereafter revolving the implement relative to the piston, for causing cleaning elements thereof to simultaneously travel in and clean all of the piston grooves.

Various other objects and advantages of the invention will hereinafter become more fully apparent from the following description of the drawings illustrating a presently preferred embodiment thereof, and wherein:

FIGURE 1 is a side elevational view showing the implement in an operative position applied to a piston;

FIGURE 2 is a top plan view of the implement shown in a retracted, operative position, as in FIGURE 1;

FIGURE 3 is a side elevational view showing the implement in a retracted, operative position and looking in the direction as indicated by the arrow designated "FIG. 3" in FIGURE 2;

FIGURE 4 is a bottom plan view of the implement shown in a retracted or operative position;

FIGURE 5 is a bottom plan view thereof with the implement shown in an extended, inoperative position;

FIGURE 6 is an enlarged fragmentary sectional view taken substantially along a plane as indicated by the line 6—6 of FIGURE 2;

FIGURE 7 is an enlarged fragmentary vertical sectional view taken substantially along the line 7—7 of FIGURE 2, and FIGURE 8 is an enlarged fragmentary vertical sectional view, partly in elevation, taken substantially along the line 8—8 of FIGURE 2.

Referring more specifically to the drawings, the piston ring groove cleaning implement in its entirety and comprising the invention is designated generally 10, and includes a body member designated generally 11. The body member 11 includes a flat circular disc-shaped plate 12 having three arms 13, 14 and 15 projecting radially from the periphery thereof, and which arms are equally spaced from one another circumferentially of said periphery. The arms 13 and 14 terminate in downturned or depending extensions forming legs 16 and 17, respectively.

A bar 18 is disposed on the upper side of the leg 15 and extends radially inwardly therefrom, and is provided with longitudinally extending aligned and spaced slots 19. Headed screw fastenings 20 extend downwardly through the slots 19. One of the fastenings 20 threadedly engages in the plate 12 and the other fastening 20 threadedly engages in the arm 15. Slots 19 accommodate sliding movement of the bar 18 relative to the fastenings 20 to the plate 12 and arm 15, and said fastenings 20 function as guides by their engagement in the slots 19 to insure sliding movement of the bar 18 only radially of the plate 12. The bar 18 has a depending extension at its outer end forming a leg 21 which depends downwardly from said bar beyond the outer end of the arm 15.

A bit suppporting bar 22 is detachably secured against the inner side of the leg 17 and longitudinally thereof by screw fastenings 23, and has three bits 24, 25 and 26 projecting inwardly therefrom, as best seen in FIGURE 6. The bits 24, 25 and 26 are longitudinally spaced relative to the bar 22 and leg 17. The legs 16 and 21 have corresponding inwardly projecting guide elements 27 and 28, respectively, which are disposed coplanar with one another and with the intermediate bit 25, as seen in FIGURE 3.

A post or turning tool receiving member 29 has an upper portion provided with wrench lands 30 around the periphery thereof. As best seen in FIGURE 8, the post 29 has a restricted circular portion 31 below the part provided with the wrench lands 30 and which has a substantially flat underside 32. A stem projects outwardly from said underside 32 and is disposed axially of the post 29. The stem includes a circular upper portion 33 which is journaled in a central opening 34 of the plate 12 and a noncircular portion 35 which engages nonturnably in a central opening 36 of a disc 37. The stem has a head 38 at its lower end which bears against the underside of the disc 37 to retain the disc against the underside of the central portion of the plate 12. A portion of the periphery of the disc 37 has an outwardly projecting ear 39 which is bent to extend downwardly from said disc beyond the periphery thereof. A stop 40 is secured in and extends downwardly from the plate 12 adjacent a portion of the periphery of the disc 37 and is disposed remote from the bar 18, as seen in FIGURE 5. A contractile coil spring 41 is connected at one end to the depending ear 39 and has its other end fastened to an anchoring element 42 which extends inwardly from the leg 21, so that the spring 41 is located in a plane beneath but adjacent the plane of the disc 37, as best seen in FIGURE 3.

The cleaning implement 10 is shown in FIGURE 5 in a released position with the ear 39 spaced from the stop 40 and disposed nearer the leg 21 than the stop 40, so that the spring 41 is not tensioned in order that the bar 18 and leg 21 can be pulled outwardly to their extended positions. In this released position, the implement is placed over the upper part of an internal combustion engine piston 43, with the legs 16, 17 and 21 extending downwardly and straddling the upper part of the piston in which are formed the ring grooves 44, 45 and 46. Implement 10 is displaced laterally of the piston 43 to move the guide element 27 into engagement with the intermediate ring groove 45 and the bits 24, 25 and 26 into engagement with the grooves 44, 45 and 46, respectively for supporting the implement 10 on the piston 43, and with the spring 41, ear 39 and stop 40 disposed above and spaced from the top surface 47 of the piston. A turning or torque imparting tool, not shown, such as a wrench is then applied to the wrench lands 30 for turning the post 29 in the plate 12 in a clockwise direction, as seen in FIGURE 2. The disc 37 turns with the post 29 relative to the plate 12, for moving the ear 39 and the end of the spring 41 connected thereto through an arc of approximately 120° from their position of FIGURE 5 to their positions of FIGURES 2 and 4, where further clockwise movement of the ear 39 is prevented by said ear engaging the stop 40. During this movement the spring 41 is tensioned and moves across the axis of the post 29 for holding the spring under tension. Usually, as the spring 41 moves from its position of FIGURE 5 to its position of FIGURE 4 it pulls the bar 18 and leg 21 radially inward to move the guide element 28 into engagement with the intermediate groove 45.

Clockwise turning of post 29 is continued after the parts have assumed their positions of FIGURE 2. However, engagement of the ear 39 with the top 40 will prevent further clockwise rotation of the post 29 relative to the plate 12, so that all parts of the cleaning implement 10 will then revolve as a unit relative to the piston 43, so that the three bits 24, 25 and 26 which conformably fit the ring grooves 44, 45 and 46, respectively, will scrape and clean said rings grooves as the implement 10 is revolved relative to the piston. After the scraping or cleaning operation has been completed, the post 29 is rotated in the opposite direction or counter-clockwise, as seen in FIGURE 2, for moving the ear 39 and the spring end connected thereto away from the stop 40 and through an arc of approximately 120° back to the position of FIGURE 5, to release the tension on the spring 41, so that the bar 18 and leg 21 can be pulled outwardly from the arm 15 for disengaging the guide element 28 from the ring groove 45. The other two legs 16 and 17 can then be moved laterally away from the piston 43 to disengage the guide element 27 and the bits 24, 25 and 26 from the ring grooves so that the implement can be detached from the piston.

It will be readily apparent that the aforedescribed cleaning operation of the ring grooves is accomplished after removal of the piston rings, not shown, therefrom. Utilizing the implement 10, the ring grooves may be cleaned simultaneously.

Various modifications and changes are contemplated and may be resorted to, without departing from the function or scope of the invention as hereinafter defined by the appended claims.

I claim as my invention:

1. A piston ring groove cleaning implement comprising a body member adapted to be disposed above an internal combustion engine piston and having depending legs adapted to straddle a peripheral portion of the piston, a set of bits supported by the extending inwardly from one of said legs and adapted to simultaneously engage each of the ring grooves of the piston, means slidably connecting a second one of said legs to the body member for radial movement of the second leg inwardly and outwardly of the body member, a guide element projecting inwardly from said second leg and adapted to engage in one of said ring grooves when the second leg is in a retracted, operative position, a turning tool receiving member journaled and extending upwardly from said body member, and means connecting said turning tool receiving member to the second leg whereby when a torque is applied in one direction to said turning tool receiving member said member initially turns relative to the body member for drawing said second leg inwardly to a retracted, operative position, said turning tool receiving member thereafter rotating the implement relative to the piston to effect cleaning of the ring grooves by the bits.

2. A piston ring groove cleaning implement as in claim 1, a guide element projecting inwardly from a third one of said legs and adapted to engage in one of said grooves, said legs being equally spaced from one another.

3. A piston ring groove cleaning implement as in claim 1, said means connecting said turning tool receiving member to said second leg including a contractile spring connected at one end to the second leg and having its opposite end connected to the turning tool receiving member, a stop carried by the body member and disposed in the path of travel of the last mentioned spring end for limiting the turning movement of the turning tool receiving member relative to the body member and during which said spring is tensioned for urging the second leg inwardly of the body member to a retracted position.

4. A piston ring groove cleaning implement as in claim 1, said means connecting the turning tool receiving member to said second leg including a resilient part which is tensioned by initial turning of said turning tool receiving member relative to the body member, a stop to limit turning movement of the turning tool receiving member after said resilient part has been tensioned for drawing the second leg inwardly to its operative position.

References Cited by the Examiner

UNITED STATES PATENTS 2,362,780  11/44  Stine _____ 15—104.01
2,412,748  12/46  Phillips _____ 15—104.01

CHARLES A. WILLMUTH, *Primary Examiner*